United States Patent

[11] 3,622,184

| [72] | Inventors | John H. Deasy<br>San Jose, Calif.;<br>Robert B. Williams, Texarkana, Tex.;<br>Frank E. Turner, San Mateo, Calif. |
|------|-----------|---|
| [21] | Appl. No. | 37,099 |
| [22] | Filed | May 14, 1970 |
| [45] | Patented | Nov. 23, 1971 |
| [73] | Assignee | Smith-Blair Inc.<br>South San Francisco, Calif. |

[54] TAPPING SADDLE FOR PLASTIC PIPE
8 Claims, 12 Drawing Figs.

[52] U.S. Cl. .................................................. 285/197
[51] Int. Cl. .......................................... F16l 41/00
[50] Field of Search ......................................... 285/197,
198, 199, 180; 251/146

[56] References Cited
UNITED STATES PATENTS

| 2,693,975 | 11/1954 | Smith | 285/199 X |
| 2,795,439 | 6/1957 | Smith | 285/199 X |
| 2,826,435 | 3/1958 | Schustack | 285/199 X |
| 3,355,193 | 11/1967 | Craig et al. | 285/197 |
| 3,432,188 | 3/1969 | Turner | 285/197 |
| 3,489,441 | 1/1970 | Malcolm | 285/197 |

FOREIGN PATENTS

| 147,060 | 9/1936 | Austria | 285/197 |

Primary Examiner—Andrew V. Kundrat
Attorney—Owen, Wickersham & Erickson

ABSTRACT: A pipe saddle particularly adapted for making a side tap in plastic pipe comprises top and bottom strap members with curved back end portions forming recesses for cooperating bar washers that conform to and seat within the recesses. Bolts extend through the bar washers and end portions of the strap members to hold them together around the pipe. The top strap member is formed with an outwardly bulging portion forming a recess around a central opening. A plastic outlet member has a base portion that seats in said recess and an integral annular boss portion that extends through the strap opening. The outlet base portion has an inner surface contour providing space for an annular gasket that seals around a side opening in the plastic pipe aligned with the annular neck of the outlet. The gasket is forced into sealing position around pipe opening when the strap bolts are tightened.

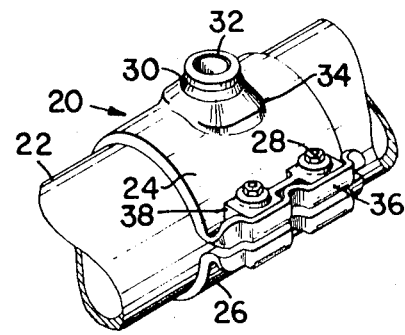
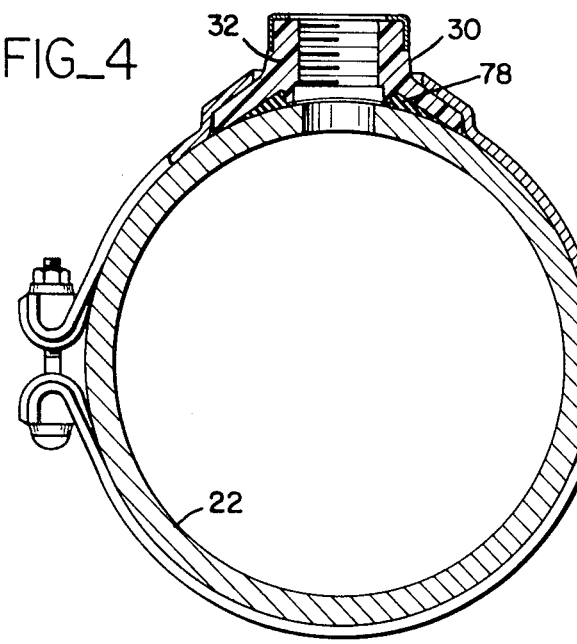
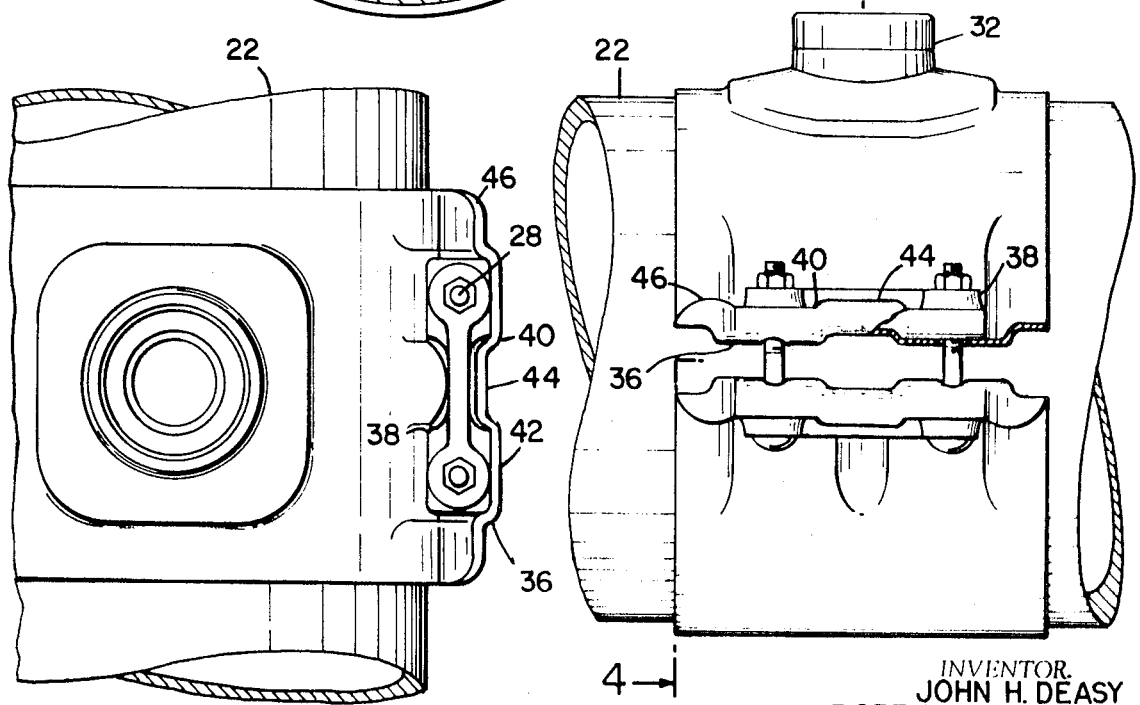

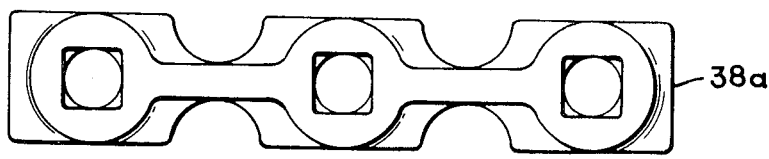
FIG_5
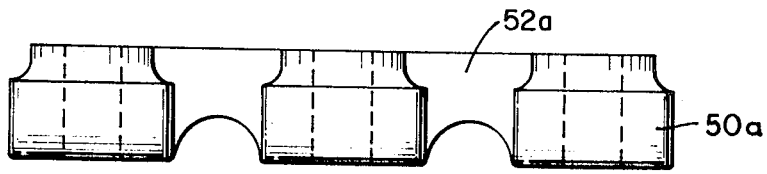
FIG_6
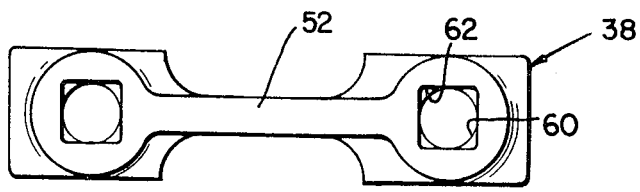
FIG_7
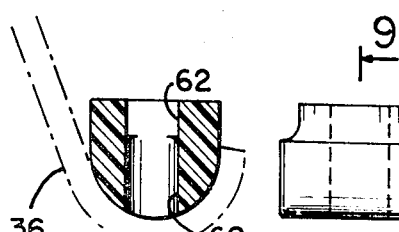
FIG_9
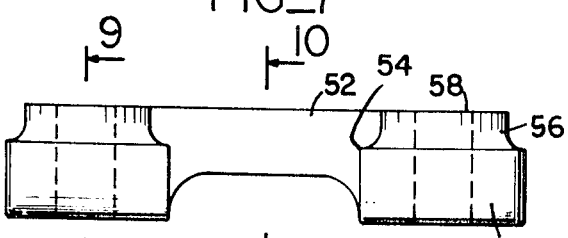
FIG_8
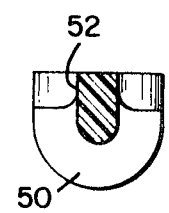
FIG_10
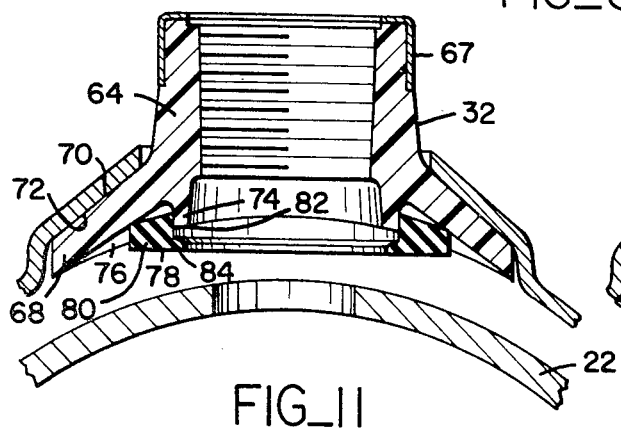
FIG_11
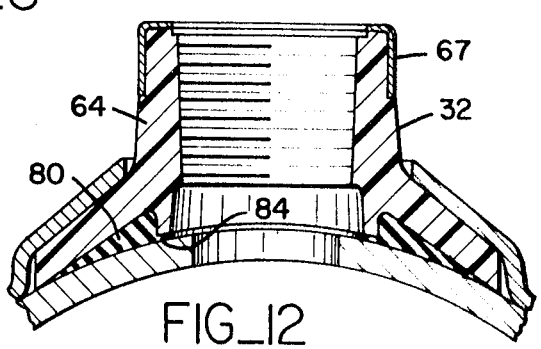
FIG_12
INVENTORS
JOHN H. DEASY
ROBERT B. WILLIAMS
FRANK E. TURNER
BY
Owen, Wickersham & Erickson
ATTORNEYS

3,622,184

TAPPING SADDLE FOR PLASTIC PIPE

This invention relates to tapping or service saddles and clamps for fluid or gas conduit systems and more particularly it relates to such devices for use on plastic pipe.

Heretofore, most service or tapping saddles were made from castings or heavy metal sections that resisted bending and had rigid ears which were integrally formed or attached to support bolts for holding the saddle sections on the pipe. Aside from the fact that such prior art service saddles were heavy, expensive and difficult to handle they had other serious disadvantages. For example, as the castings with ears were tightened they tended to create an uneven or extra heavy pressure at certain locations due to the leverage exerted on the clamp as the bolt was tightened. In many instances, the leverage was great enough to lift the casting band near the ear away from the pipe. Other types of lugs or bands had similar defects with respect to performance as well as design requiring excessive material. Service clamps using a relatively thin metal for the band were devised, but on these it was found necessary to attach rigid lugs to the ends of the band by some means such as riveting or welding in order to draw the band about the pipe.

One object of the present invention is to provide an improved service clamp or tapping saddle that solves the aforementioned problems and utilizes relatively light weight metal for the band without requiring rigid lugs that must be attached in some manner to its ends.

Another object of the present invention is to provide a tapping or service saddle that is particularly adaptable for use on plastic pipe.

Although plastic pipe for fluid conduit systems provides significant advantages over metal pipe for certain applications, additional problems may arise when making a tap into such pipe to attach a smaller branching pipe. For example, extreme care must be taken with plastic pipe to avoid making any surface abrasion or scoring that can cause stress notching and thereby weaken the pipe and cause it to eventually fail when subjected to fluid pressure. Also, plastic pipe must be well supported around the area of the tap to avoid distortions and excessive stresses in the pipe wall, particularly when the bolts for the saddle are tightened. Further, the tapping device must be adequately sealed so as to prevent leakage from around the tapping outlet. The present invention provides a tapping saddle that eliminates the aforesaid problems.

Another object of the present invention is to provide a tapping saddle comprised of a pair of top and bottom strap members that will support the pipe with an evenly distributed surface pressure without the necessity of applying excessive tightening torque to the bolts, thereby reducing the possibility of over stressing or distorting the pipe walls.

Yet another object of the present invention is to provide strap members for a pipe clamp or saddle that provides a high degree of support for a pipe to which they are attached and which will not cause surface indentations, abrasions or scoring on the pipe surface either when the tap is being made or later during final installation when a large tightening force may be used.

Another object of the present invention is to provide a tapping saddle comprised of elements which are all unusually corrosion resistant and thus will not deteriorate even when installed on a conduit within the ground for long periods of time.

Another object of the present invention is to provide a tapping saddle with an outlet fitting and a gasket therefore that provides an effective and long-lasting seal around the service outlet on the pipe.

Still another object of the present invention is to provide a tapping saddle that is particularly well adapted for ease and economy of manufacture especially in the larger sizes for use on relatively large diameter pipe.

The aforesaid and other objects are accomplished by a combination of elements including top and bottom strap or band members formed with similar end portions that are rolled back or curved up to form a strong ribbing structure having a series of spaced-apart recesses. Each curved back end portion cradles a swivel-type lug or a bar washer made of durable plastic material and having spaced-apart portions that fit within the recesses of the strap end portions. These bar washers are movable within the strap end portions so that they will automatically adjust themselves to distribute evenly the forces created when the bolts through the washers are tightened. This results in an even distribution of pressure by both strap members over the surface of the pipe and a heavy tightening action can be maintained without scouring off any protective coating, such as a vinyl plastic applied to the band to prevent corrosion. As the strap or band members are tightened they are not deformed but snugly fit the pipe by adjusting to the pipe's diameter, and additional pull creates an even band pressure completely around the pipe.

An outlet member for our tapping saddle has a base portion shaped to fit a recess formed by a bulged out portion around an opening in the top strap member. This base portion is shaped with an annular recess on its underside so that only its periphery engages the pipe surface, the annular recess thereby forming a seat for a unique gasket that surrounds the opening in the pipe. This gasket is shaped so that it will deform and provide a fluidtight seal around the side opening in the pipe when the bolts for the strap members are tightened.

Other objects, advantages and features of the invention will become apparent from the following detailed description, presented in conjunction with the accompanying drawings, in which:

FIG. 1 is a view in perspective showing a tapping saddle embodying the principles of the present invention;

FIG. 2 is a larger view in side elevation of the saddle shown in FIG. 1;

FIG. 3 is a plan view of the saddle of FIGS. 1 and 2, with portions broken away to conserve space;

FIG. 4 is a view in section taken along line 4—4 of FIG. 2;

FIG. 5 is an enlarged view in side elevation of a bar washer for three bolts embodying the principles of the invention;

FIG. 6 is a top view of the washer in FIG. 5;

FIG. 7 is a view in side elevation of a bar washer for two bolts according to the invention;

FIG. 8 is a top view of the washer of FIG. 7;

FIG. 9 is a view in section taken along 9—9 of FIG. 7;

FIG. 10 is a view in section taken along 10—10 of FIG. 7;

FIG. 11 is an enlarged view of the outlet member for the saddle in FIGS. 1–4; and FIG. 12 is a fragmentary view of the outlet member of FIG. 11 showing the gasket in place after the saddle has been installed.

With reference to the drawing, FIG. 1 shows a tapping saddle 20 embodying the principles of our invention as it appears when installed on a main pipe 22 and ready for installation of a branch pipe. The embodiment shown comprises generally a pair of top and bottom strap members 24 and 26 that are connected together and held tightly around the pipe 22 by a plurality of bolts 28. The top strap member has an opening 30 through which extends a side outlet fitting 32 that is threaded internally for connection to the branch pipe. This fitting is retained within a protruding or bulged out portion 34 of the top strap member that is formed to extend outwardly from its normal semicylindrical contour around the opening 30. Both the top and bottom straps of the saddle 20 are made of a relatively light sheet metal (e.g., No. 12 gauge mild steel) and are preformed, as in a press, with curved back end portions 36. Seated within each end portion of each strap member is a barlike swivel lug or washer member 38 having spaced-apart holes which align with holes in the strap end portions to accommodate the bolts 28.

As shown more clearly in FIGS. 2-4, the strap end portions 36 are formed into a ribbing structure with a unique shape that provides spaced-apart depressions or recesses 40, and the bar washer members 38 are shaped to fit or cradle within these recesses. In the saddle 20 of FIGS. 1-4, each strap end portion 36 is shaped to accommodate two bolts 28 and thus it is comprised of two portions 42 of equal length that have a semicylindrical shape in cross section. Between these semicylindrical-shaped recess portions 42 on each strap end portion 36 is a rib depression 44 that gradually blends into the normal curvature of the strap, and at the outer end of each portion 42 is a similarly formed rib portion 46 that provides a curved up arcuate edge of the strap end portion. Thus, the combination of the semicylindrical-shaped portions 42, the rib depression 44 between, and the rib depressions 46 at their ends form spaced-apart recessions 40 for similarly shaped portions of the bar washer 38. A further important advantage of this ribbing construction is that it allows the use of light gauge material and yet provides considerable strength where it is needed to draw the saddle strap members snug around the pipe.

The bar washer 38 for the saddle 20 which accommodates two bolts is shown in greater detail in FIGS. 7-10. It is preferably molded from some suitable, moldable plastic material such as polypropylene so that it is strong, durable and completely corrosion resistant, as well as being easy and inexpensive to manufacture. As seen, each bar washer 38 has a pair of enlarged semicylindrical shaped portions 50 that are spaced-apart and held together by a narrow web portion 52. These semicylindrical portions fit directly within the recesses 40 of the strap end portions 36. Extending rearwardly from a flat face 54 on each portion 50 is a boss portion 56. Each of these boss portions has a flat outer face 58 forming a bearing surface that is perpendicular to the axis of a bolt hole 60 that extends through the boss portion 56 and the integral portion 50 of the washer member. Preferably, each bolt hole at the boss surface 58 is countersunk with a square shaped recess 62 to accommodate the head end of carriage-type bolts. While the saddle 20, as shown, utilizes only two bolts, it should be apparent that a different number of bolts may be used, if desired. In FIGS. 5-6, as shown, a modified bar washer 38a that is intended for use with three bolts and therefore has three enlarged semicylindrical portions 50a interconnected by web portions 52a.

In accordance with our invention the side outlet fitting 32 is preferably molded as a one-piece unit from a suitable plastic material such as polypropylene. It may, however, be made of other materials such as a corrosion resistant metal. As shown best in FIGS. 11 and 12, this fitting has an annular boss portion 64, provided with internal threads 66, for receiving a branch pipe. A reinforcing metal ring 67 is attached around the outer circular edge of this boss portion and fits within a recess so that its cylindrical portion is flush with the outer surface of this boss portion. Integral with the boss portion is base member 68 having generally the same size and noncircular shape similar to the bulged out portion 34 of the top strap member. In cross section, the upper surface 70 of the base member slopes upwardly from its outer edge and terminates at the base of the boss portion 64. A lower surface 72 also slopes upwardly from the outer edge toward the boss portion and terminates at an annular internal boss portion 74. Thus, an annular space 76 that is tapered in cross section is formed under the base member 68 of the outlet fitting 32 between its edge and internal boss portion 74. The outwardly bulging portion 34 of the top strap member 24 around the opening 30 is shaped to accommodate the outlet fitting 32 so that when its inner surface bears against the upper surface 70 of the fitting's base member, the edge of this base member extends slightly inwardly beyond the inner surface of the top strap. Thus, when the top strap is tightened in place, the bulged out portion 34 of the strap member presses the outlet fitting 32 firmly against the pipe surface.

An annular gasket 78 of elastomeric material is provided within the space 76 formed under the base portion 68 of the outlet fitting and around the downwardly extending internal boss portion 74. This gasket has a main annular portion 80 with wedge-shaped cross section that tapers outwardly from an inner cylindrical wall 82. At the lower edge of this wall is a smaller annular portion 84 that tapers inwardly and also extends underneath the internal boss portion 74. FIG. 11 shows the gasket 78 before the straps are tightened into position. In a normal installation, as shown in FIG. 12, with the top strap 24 tightened into position, the outlet fitting 30 presses against the pipe and the internal annular boss portion pushes against the smaller portion of the gasket. Simultaneously, the larger portion 80 of the gasket 78 is distorted to fill the space 76 beneath the base portion of the outlet fitting. Thus, this normal pressure on the gasket forms an extremely effective seal around the side opening in the pipe without requiring a large amount of torque on the tightening bolts.

To install the saddle 20 on a pipe the top and bottom straps 24 and 26 are placed into position and the bolts are tightened in the conventional manner. With the bar washer members 28 and strap end portions 36 shaped as described, the washer members automatically adjust themselves to a properly seated position as the bolts are tightened and this equalizes the stress on the bolts as well as the surface pressure of the straps on the pipe.

Thus, the shape of the strap members with their curved and ribbed end portions 36 provides a saddle that is unusually strong for the amount of metal used and can be drawn tightly around the pipe. Moreover, it provides a large area of circumferential support around the pipe which prevents distortion and reduces the possibility of creating areas of high stress concentration as the bolts are tightened. These broad straps also provide great support to resist torsional moments which are induced when a heavy drilling machine is attached to the saddle and the hole drilling operation in the pipe takes place. During this operation, the ends of the straps tend to rotate laterally with one side rotating into the pipe and the other side rotating away from it. In our saddle, the side edges of band at their end portions are turned up at the ribs 46 and do not make contact with the pipe. Therefore, no gouging or scouring of the pipe can occur when the saddle is subjected to these torsional loads. Preferably, the straps are coated with a corrosion protective material (not shown) such as a vinyl plastic and stainless steel bolts are used. When this coating is applied and the bar washer members 28 and outlet fitting 32 are made of plastic and the bolts are of stainless steel, the entire saddle assembly is fully corrosion resistant. The layer of plastic material on the inner surface of the straps also affords a slight cushioning effect that further prevents localized stresses on the pipe as well as possible damage to the pipe surfaces.

The saddle 20, as shown, utilizes a top and a bottom strap to provide a single side branch or connection. If desired, two top straps 24 could be utilized to provide a double side branch or a X-connection from a main conduit. Or, two bottom strap members 26 could be utilized to provide a pipe repair clamp if used with an appropriate wrap around gasket.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

We claim:

1. A tapping saddle for a pipe comprising:
   top and bottom strap members each having a curvature similar to that of the pipe and an integral curved back end portion on each end having a plurality of spaced apart recesses;
   a bar washer member for each end portion on said strap members, said washer member being shaped with enlarged portions having an arcuate contour on one side and said enlarged portions are connected by narrower web portions and conform to the shape of and therefore seat within said recesses of said curved back end portion;
   an opening in said top strap member surrounded by a bulged out portion that extends outwardly beyond the normal outer contour of said top strap member and forms a recess on the interior surface of said top strap member;

outlet fitting means having a base portion seated within said top strap recess and an annular boss portion integral with said base portion that extends through said strap opening; and bolt means extending through said bar washer members and the adjacent end portions of said strap members for securing them around a pipe.

2. The saddle as described in claim 1 wherein said enlarged portions have a generally semicylindrical shape with a curved surface on one side and a flat rear surface, a boss portion extending rearwardly from each said rear surface and a bolt hole extending through said boss portion and through the opposite curved surface of each enlarged portion.

3. The saddle as described in claim 1 wherein said outlet fitting means is also solid plastic material and has an internal annular wall forming an extension of said annular boss portion, said base portion being shaped to form a space around said annular wall, and elastomeric gasket means surrounding said internal annular wall for sealing around it when the saddle strap members are drawn together by said bolt means.

4. The saddle as described in claim 3 wherein said annular gasket includes a relatively large annular portion with a relatively large tapered cross section that extends around said annular wall and a relatively small annular portion having a tapered cross section that extends under said extension of said annular boss portion and is forced against the pipe wall while the saddle is installed.

5. A device for covering a side opening in a pipe comprising:
strap means adapted to be installed around the pipe and having a curvature similar to that of the pipe, said strap means being formed from sheet metal and having integral end portions that are each curved back to form a plurality of spaced-apart recesses having depressed rib portions on their opposite sides;
a bar washer member for each curved back end portion on said strap means, said washer member being shaped with enlarged portions connected by web means, each having a contour on one side that conforms to the shape of said spaced-apart recesses;
and bolt means extending through each said enlarged portion of said bar washer members and the adjacent end portions of said strap members for securing the strap members around a pipe.

6. The device as described in claim 5 including an opening in one of said strap means surrounded by a bulged out portion with a noncircular shape that extends outwardly beyond its normal outer contour, thereby forming a recess on its interior surface;
and outlet fitting means having a noncircular base portion with a similar shape to and seated within said strap recess and an annular boss portion integral with said base portion extending through said strap opening.

7. The device as described in claim 7 wherein each said bar washer member is solid plastic, and its said enlarged portions are connected by integral web members each having a semicylindrical surface on one side with a boss portion that extends from the opposite side from the cylindrical surface for retaining a bolt member.

8. A tapping saddle for a pipe comprising:
top and bottom strap members each having a curvature similar to that of the pipe and an integral curved back end portion on each end;
a bar washer member of plastic material for each end portion on said strap members, said washer member being shaped with an arcuate contour on one side that conforms to the shape of and therefore seats itself within said curved back end portion;
an opening in said top strap member surrounded by a bulged out portion that extends outwardly beyond the normal outer contour of said top strap member and forms a recess on the interior surface of said top strap member;
outlet fitting means having a base portion seated within said top strap recess and an annular boss portion integral with said base portion that extends through said strap opening;
and bolt means extending through said bar washer members and the adjacent end portions of said strap members for securing them around a pipe, said strap members and said bolt means all being coated with a layer of electrically nonconductive plastic material.

* * * * *

UNITED STATES PATENT OFFICE
CERTIFICATE OF CORRECTION

Patent No. 3,622,184　　　　　　　　Dated　November 23, 1971

Inventor(s) John H. Deasy, et al

It is certified that error appears in the above-identified patent and that said Letters Patent are hereby corrected as shown below:

Column 4, line 48, after "or" insert -- "T" -- . Column 6, line 13, "claim 7" should read -- claim 5 -- .

Signed and sealed this 17th day of October 1972.

(SEAL)
Attest:

EDWARD M. FLETCHER, JR.　　　　　　ROBERT GOTTSCHALK
Attesting Officer　　　　　　　　　　Commissioner of Patents